(12) United States Patent
Nakamura et al.

(10) Patent No.: US 6,830,348 B2
(45) Date of Patent: Dec. 14, 2004

(54) ANTIGLARE AND ANTIREFLECTION FILM, POLARIZER, AND IMAGE DISPLAY DEVICE

(75) Inventors: Kazuhiro Nakamura, Kanagawa (JP); Naohiro Matsunaga, Kanagawa (JP); Tsutomu Arai, Kanagawa (JP); Shinichi Otani, Kanagawa (JP); Hidekazu Yamazaki, Kanagawa (JP); Hirohisa Hokazono, Kanagawa (JP)

(73) Assignee: Fuji Photo Film Co., Ltd., Minami Ashigara (JP)

( * ) Notice: Subject to any disclaimer, the term of this patent is extended or adjusted under 35 U.S.C. 154(b) by 97 days.

(21) Appl. No.: 10/287,611

(22) Filed: Nov. 5, 2002

(65) Prior Publication Data
US 2003/0112519 A1 Jun. 19, 2003

Related U.S. Application Data

(62) Division of application No. 09/901,674, filed on Jul. 11, 2001, now Pat. No. 6,502,943.

(30) Foreign Application Priority Data

| Jul. 19, 2000 | (JP) | ................................. | P.2000-219345 |
| Aug. 11, 2000 | (JP) | ................................. | P.2000-244817 |
| Aug. 31, 2000 | (JP) | ................................. | P.2000-263715 |
| Aug. 31, 2000 | (JP) | ................................. | P.2000-263814 |
| Oct. 31, 2000 | (JP) | ................................. | P.2000-332734 |

(51) Int. Cl.$^7$ ............................................. G02B 5/08
(52) U.S. Cl. ...................... 359/603; 359/604; 359/608; 359/613; 359/614
(58) Field of Search ........................... 359/603–609, 359/613–614, 493; 349/105, 122, 137; 428/143, 147, 206, 421

(56) References Cited

U.S. PATENT DOCUMENTS

| 5,847,795 | A | 12/1998 | Satoh et al. |
| 5,919,555 | A | 7/1999 | Yasuda et al. |
| 6,171,457 | B1 | 1/2001 | Kim |
| 6,333,592 | B1 | 12/2001 | Sasa et al. |

FOREIGN PATENT DOCUMENTS

| JP | 7-287102 A | 10/1995 |
| JP | 7-333404 A | 12/1995 |

*Primary Examiner*—Mohammad Sikder
(74) *Attorney, Agent, or Firm*—Burns, Doane, Swecker & Mathis, L.L.P.

(57) ABSTRACT

An antiglare and antireflection film is provided, which can be formed by a wet-coating method and which is excellent in the antireflection property, antifouling property, scratch resistance, clearness of transmitted image and planar uniformity. A polarizer and a liquid crystal display device using this film are also provided.

An antiglare and antireflection film is provided, comprising a transparent support having thereon an antiglare hard coat layer and a low refractive index layer having a refractive index of 1.38 to 1.49, wherein the low refractive index layer is formed by a coating method, the solvent of the coating solution for forming the low refractive index layer comprises one or more solvent, and from 50 to 100% by mass of the solvent is a solvent having a boiling point of 100° C. or less. A polarizer and a liquid crystal display device using this film are also provided.

14 Claims, 1 Drawing Sheet

ANTIGLARE AND ANTIREFLECTION FILM, POLARIZER, AND IMAGE DISPLAY DEVICE

This Application is a Division of Ser. No. 09/901,674 filed Jul. 11, 2001 now U.S. Pat. No. 6,502,943.

FIELD OF THE INVENTION

The present invention relates to an antireflection film having antiglare property, and a polarizer, a liquid crystal display device and an image display device using the same. The present invention also relates to a coating solution for forming the low refractive index layer of an antiglare and antireflection film.

BACKGROUND OF THE INVENTION

An antiglare film, an antireflection film or an antiglare and antireflection film is generally disposed, in an image display device such as cathode ray tube display device (CRT), plasma display panel (PDP) and liquid crystal display device (LCD), on the outermost surface of a display where the reflectance is reduced by using the principle of optical interference so as to prevent reflection of external light which causes reduction in the contrast or reflection of an image.

An antiglare and antireflection film having an antireflection function is more excellent in such a performance than an antiglare film, and use thereof in a display is recently started.

However, if the antireflection function is imparted, the dust protection on the surface generally changes for the worse and dusts readily attach thereto. Dusts may be gathered on the display for removing the attached dusts but the gathered dusts cannot be removed from the display. This is a serious problem on considering using the antiglare and antireflection film for television in the future.

Heretofore, antireflection function and prevention of dusts from sticking cannot be attained at the same time.

On the other hand, in the antireflection film having only a hard coat layer and a low refractive index layer on a transparent support, the refractive index of the low refractive index layer must be satisfactorily lowered so as to reduce the reflectance. For example, in the case of an antireflection film having a triacetyl cellulose support and using UV cured film of dipentaerythritol hexaacrylate as the hard coat layer, the refractive index must be lowered to 1.40 or less so as to reduce the average reflectance to 1.6% or less in the range from 450 to 650 nm.

With respect to the material having a refractive index of 1.40 or less, the inorganic material include fluorine-containing compounds such as magnesium fluoride and calcium fluoride, and the organic material include fluorine compounds having a large fluorine content. However, these fluorine-containing compounds have no cohesion and therefore, are deficient in the scratch resistance as a film disposed on the outermost surface of a display. In order to have sufficiently high scratch resistance, a compound having a refractive index of 1.43 or more is necessary. As such, it is difficult to attain low refractive index and scratch resistance at the same time.

JP-A-7-287102 (the term "JP-A" as used herein means an "unexamined published Japanese patent application") describes a technique of increasing the refractive index of hard coat layer and thereby reducing the reflectance. However, due to large difference in the refractive index between this high refractive index hard coat layer and the support, color irregularity is generated on the film and the dependency of the reflectance on the wavelength greatly fluctuates.

JP-A-7-333404 describes an antiglare and antireflection film excellent in the gas barrier property, antiglare property and antireflection property, where, however, a silicon oxide film by CVD method is indispensable and therefore, the productivity is low as compared with the wet-coating method of forming a film by coating a coating solution. Furthermore, the antiglare and antireflection film obtained as such is not satisfied in the antireflection property.

SUMMARY OF THE INVENTION

According to the knowledge newly found by the present inventors, for obtaining an antiglare and antireflection film excellent in the antireflection property, antifouling property, scratch resistance and clearness of transmitted image by all-wet coating, it is preferred to use resin particles having a narrow particle size distribution with a number average particle size by the Coulter method of about 2 to 3 $\mu$m, in the antiglare hard coat layer. However, in view of the design of surface asperities, such an antiglare hard coat layer suffers from narrow latitude in the average particle size and the particle size distribution of the resin particles used and furthermore, grain-like planar failures are readily caused throughout the film due to a very small amount of coarse grains, environment and mixing of foreign matters mingled into the support or the like.

The present inventors have found that use of a transparent support having excellent smoothness is preferred for obtaining, by all-wet coating, an antiglare and antireflection film excellent in the antireflection property, antifouling property, scratch resistance and clearness of transmitted image and favored with high planar uniformity while reducing the planar unevenness at the wet coating and that in particular, a transparent support for use in the antiglare layer having excellent clearness of transmitted image is required to have high smoothness. The present invention has been accomplished based on these findings.

An object of the present invention is to provide an antiglare and antireflection film which can be formed by a wet-coating method and which is excellent in the antireflection property, antifouling property, scratch resistance, clearness of transmitted image and planar uniformity.

Another object of the present invention is to provide an antiglare and antireflection film which is favored with planar uniformity at the same time with various performances such as antireflection property, antifouling property, scratch resistance and clearness of transmitted image and which can be obtained by an all-wet coating method.

Still another object of the present invention is to provide an antiglare and antireflection film which can be simply and inexpensively produced only by forming an antiglare hard coat layer and a low refractive index layer on a support and which is favored with a sufficiently high antireflection performance, scratch resistance and antifouling property.

Still another object of the present invention is to provide a polarizer and a liquid crystal display device using such an excellent antiglare and antireflection film.

Still another object of the present invention is to provide a polarizer and a liquid crystal display device, which are satisfactorily prevented from the reflection of exterior light and at the same time, favored with excellent antifouling property and high scratch resistance.

Still another object of the present invention is to provide a liquid crystal display device excellent in the contrast, visibility and clearness of image, and favored with good planar uniformity.

Still another object of the present invention is to provide an antiglare and antireflection film excellent in the dust protection (prevention of dusts from sticking) and having a small reflectance.

Still another object of the present invention is to provide a polarizer and an image display device using an antiglare and antireflection film excellent in the above-described properties.

Still another object of the present invention is to provide a coating solution capable of forming a low refractive index layer, which is a layer constituting the antiglare and antireflection film, to have good coated surface state and a uniform coating thickness.

According to the present invention, an antiglare and antireflection film, a polarizer, a liquid crystal display device and a coating solution for a low refractive index layer having the following constructions are provided and the above-described object can be attained.

(1) An antiglare and antireflection film comprising a transparent support having thereon an antiglare hard coat layer and a low refractive index layer having a refractive index of 1.38 to 1.49, wherein the low refractive index layer is formed by a coating method, the solvent of the coating solution for forming the low refractive index layer comprises one or more solvent, and from 50 to 100% by mass of the solvent is a solvent having a boiling point of 100° C. or less.

(2) The antiglare and antireflection film as described in (1), wherein from 90 to 100% by mass of the solvent of the coating solution is a solvent having a boiling point of 100° C. or less.

(3) The antiglare and antireflection film as described in (1), wherein the solvent of the coating solution is a ketone and/or an ester.

(4) The antiglare and antireflection film as described in (3), wherein the solvent of the coating solution for the low refractive index layer is 2-butanone.

(5) The antiglare and antireflection film as described in (1), wherein the low refractive index layer comprises a fluorine-containing compound crosslinked by heat or ionizing radiation and has a kinetic coefficient of friction of 0.03 to 0.15 and a contact angle to water of 90 to 120°.

(6) The antiglare and antireflection film as described in (1), wherein the low refractive index layer contains inorganic fine particles having an average particle size of 0.001 to 0.2 µm.

(7) The antiglare and antireflection film as described in (1), wherein the antiglare hard coat layer contains mat particles having an average particle size of 1.0 to 10.0 µm and the portion other than the mat particles of the antiglare hard coat layer has a refractive index of 1.57 to 2.00.

(8) The antiglare and antireflection film as described in (7), wherein the mat particles contains a particle satisfying the following conditions (i) to (iii) with respect to the particle size distribution:

Conditions with Respect to Particle Size Distribution (i) the number average particle size measured by the Coulter method is from 1.7 to 3.5 µm, (ii) the standard deviation of the particle size is 25% or less of the number average particle size, and (iii) coarse particles having a particle size 3.0 µm or more larger than the number average particle size or coarse particles 2.5 times or more larger than the number average particle size are contained in a proportion less than 5 particles/$1 \times 10^8$ particles.

(9) The antiglare and antireflection film as described in (1), wherein a haze is 3.0 to 20.0% and the average reflectance of light with a wavelength of 450 to 650 nm is 1.8% or less.

(10) An antiglare and antireflection film having asperities on the surface, wherein the vertical release charge amount measured with triacetyl cellulose or polyethylene terephthalate at an ordinary temperature and an ordinary humidity is −200 to +200 pc (picocoulomb)/cm$^2$ and the surface resistivity is $1 \times 10^{11}$ Ω/□ or more.

(11) The antiglare and antireflection film as described in (10), wherein the vertical release charge amount is from −100 to +100 pc/cm$^2$.

(12) The antiglare and antireflection film as described in (11), which is an antiglare and antireflection film in a post-saponification system of performing the saponification after coating the antireflection layer.

(13) The antiglare and antireflection film as described in (10), wherein the vertical release charge amount with triacetyl cellulose or polyethylene terephthalate under conditions of ordinary temperature and 10% RH is −100 to +100 pc/cm$^2$ and the surface resistivity is $1 \times 10^{11}$ Ω/□ or more.

(14) The antiglare and antireflection film as described in (10), wherein the low refractive index layer comprises a fluorine-containing compound crosslinked by heat or ionizing radiation and has a kinetic coefficient of friction of 0.03 to 0.15 and a contact angle to water of 90 to 120°.

(15) The antiglare and antireflection film as described in (1), wherein the transparent support is a triacetyl cellulose film obtained by dissolving triacetyl cellulose in a solvent and casting the prepared triacetyl cellulose dope using a single layer casting method or a multiple layer co-casting method.

(16) The antiglare and antireflection film as described in (15), wherein the triacetyl cellulose dope is a triacetyl cellulose dope prepared by dissolving triacetyl cellulose in a solvent containing substantially no dichloromethane, using a low-temperature or high-temperature dissolving method.

(17) A polarizer using an antiglare and antireflection film for at least one sheet of two protective films of the polarizing layer, the antiglare and antireflection film comprising a transparent support having thereon an antiglare hard coat layer and a low refractive index layer having a refractive index of 1.38 to 1.49, wherein the low refractive index layer is formed by a coating method, the solvent of the coating solution for forming the low refractive index layer comprises one or more solvent, and from 50 to 100% by mass of the solvent is a solvent having a boiling point of 100° C. or less.

(18) A liquid crystal display device using, for the outermost layer of the display, an antiglare and antireflection film comprising a transparent support having thereon an antiglare hard coat layer and a low refractive index layer having a refractive index of 1.38 to 1.49, the low refractive index layer being formed by a coating method, the solvent of the coating solution for forming the low refractive index layer comprising one or more solvent, and from 50 to 100% by mass of the solvent being a solvent having a boiling point of 100° C. or less.

(19) A process for producing an antiglare and antireflection film comprising a transparent support having thereon an antiglare hard coat layer and a low refractive index layer having a refractive index of 1.38 to 1.49, wherein the low refractive index layer is formed by a coating method, the solvent of the coating solution for forming the low refractive index layer comprises one or more solvent, and from 50 to 100% by mass of the solvent is a solvent having a boiling point of 100° C. or less.

EXPLANATION OF SYMBOLS

Figure 1:
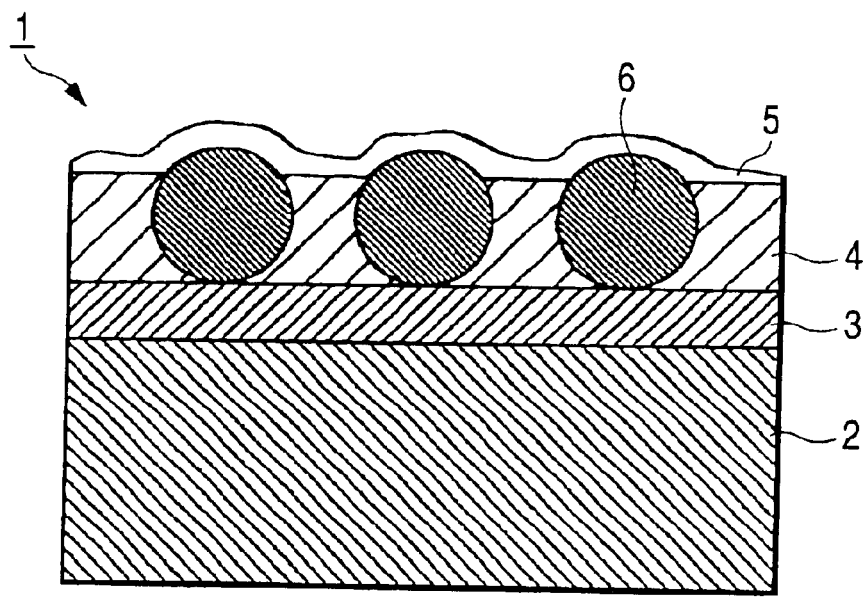
FIG. 1 is a schematic cross-sectional view schematically showing the layer structure of an antiglare and antireflection film.

1: antiglare and antireflection film
2: transparent support
3: hard coat layer
4: antiglare hard coat layer
5: low refractive index layer
6: mat particle
7: antiglare layer
8: antiglare particle

DETAILED DESCRIPTION OF THE INVENTION

The numerals expressed with the units "% by mass" and "part by mass" as used herein are almost the same as the numerals expressed with the units "% by weight" and "part by weight", respectively.

The fundamental structure of a suitable antiglare and antireflection film according to one practical embodiment of the present invention is described below by referring to the drawings.

FIG. 1 is a view schematically showing an example of the antiglare and antireflection film according to one preferred embodiment of the present invention, where the antiglare and antireflection film 1 has a layer structure of a transparent support 2, a hard coat layer 3, an antiglare hard coat layer 4 and a low refractive index layer 5 in this order. In the antiglare hard coat layer 4, mat particles 6 are dispersed. The construction material for the portion other than the mat particles 6 of the antiglare hard coat layer 4 preferably has a refractive index of 1.57 to 2.00. The refractive index of the low refractive index layer 5 is preferably from 1.38 to 1.49. The hard coat layer 3 is not essential but is preferably provided so as to impart film strength.

The transparent support of the antiglare and antireflection film of the present invention is preferably a plastic film. Examples of the polymer for forming the plastic film include cellulose esters (e.g., triacetyl cellulose, diacetyl cellulose), polyamide, polycarbonate, polyesters (e.g., polyethylene terephthalate, polyethylene naphthalate), polystyrene, polyolefin, norbornene-based resin (ARTON, a trade name, produced by JSR) and amorphous polyolefin (ZEONEX, a trade name, produced by Nippon Zeon Co., Ltd.). Among these, preferred are triacetyl cellulose, polyethylene terephthalate and polyethylene naphthalate, and more preferred is triacetyl cellulose.

The light transmittance of the transparent support is preferably 80% or more, more preferably 86% or more. The haze of the transparent support is preferably 2.0% or less, more preferably 1.0% or less. The refractive index of the transparent support is preferably from 1.4 to 1.7.

From the standpoint of using the antiglare and antireflection film of the present invention as a surface protective film of an image display device having excellent dust-protecting property (prevention of dusts from sticking), the transparent support is preferably triacetyl cellulose for LCD and preferably polyethylene terephthalate or polyethylene naphthalate for PDP and CRT, and in the case of other rear projections, polycarbonate is preferred in addition to those supports.

The transparent support of the antiglare and antireflection film of the present invention is, in use for LCD, preferably a triacetyl cellulose film obtained by dissolving triacetyl cellulose in a solvent and casting the prepared triacetyl cellulose dope by either one casting method, single layer casting or multilayer co-casting. From the standpoint of environmental conservation, a triacetyl cellulose film obtained by using a triacetyl cellulose dope prepared by dissolving triacetyl cellulose in a solvent containing substantially no dichloromethane by a low-temperature or high-temperature dissolution method is more preferred.

The transparent support for use in the antiglare and antireflection film of the present invention is preferably a triacetyl cellulose film composed of a plurality of layers. The number of layers is preferably from 3 to 5, more preferably 3.

The single-layer triacetyl cellulose is produced by drum casting, band casting or the like disclosed in JP-A-7-11055 and the triacetyl cellulose comprising a plurality of layers in the latter case is produced by a so-called co-casting method disclosed in JP-A-61-94725 and JP-B-62-43846 (the term "JP-B" as used herein means an "examined Japanese patent publication"). More specifically, raw material flakes are dissolved in a solvent such as halogenated hydrocarbons (e.g., dichloromethane), alcohols (e.g., methanol, ethanol, butanol), esters (e.g., methyl formate, methyl acetate) and ethers (e.g., dioxane, dioxolane, diethyl ether), and after adding various additives, if desired, such as plasticizer, ultraviolet absorbent, deterioration inhibitor, slipping agent and release accelerator, the resulting solution (called a dope) is cast on a support comprising a horizontal endless metal belt or a rotating drum using dope feed means (called a die). At the casting, in the case of single layer casting, a single dope is cast to a single layer and in the case of multilayer casting, a low-concentration dope is co-cast in both sides of a high-concentration cellulose ester dope. After proper drying on the support, the film imparted with rigidity is released from the support and then passed through a drying zone using transportation means of various types to remove the solvent.

Since the low-concentration dope is co-cast in both sides of a high-concentration triacetyl cellulose dope, the triacetyl cellulose film obtained by this method is characterized by excellent smoothness on the film surface and high productivity.

By using such a support, streaked coating unevenness due to planar failure of the support generated at the time of wet-coating the antiglare layer of the antiglare and antireflection film of the present invention can be remarkably improved and the antiglare and antireflection film obtained can have both excellent clearness of transmitted image and uniform planar state at the wet coating.

Furthermore, the triacetyl cellulose film prepared by the above-described method comprises a plurality of layers but a clear interface is not present between respective layers and the layers form a continuous layer together, so that optical loss due to reflection between interfaces or the like can be prevented from occurring.

The triacetyl cellulose film prepared by the above-described method is improved in the surface unevenness particularly in the cross direction and this brings about a great effect of improving the coating unevenness in the cross direction at the time of forming an upper layer by wet-coating.

The smoothness in the cross direction can be evaluated in a wide measurement range (a few centimeters to about tens of centimeters) with respect to the surface asperities of each pitch component obtained by measuring the surface displacement using a laser displacement gauge.

When triacetyl cellulose films prepared by various methods are evaluated as described above, it is clarified that as the height of surface asperities in a pitch of 3 to 10 mm is smaller, higher effect can be attained on the planar failure generated at the time of providing an antiglare layer or a low refractive index layer, particularly the streaked failure continuously generated in the longitudinal direction due to unevenness of the film thickness in the cross direction. By the above-described method, a support having a small height of surface asperities in a pitch of 3 to 10 mm can be obtained. In particular, surface asperities having a height of $1/10,000$ or more of the pitch can be eliminated.

On this support, a hard coat layer, if desired, and as essential layers, an antiglare layer and a low refractive index layer are formed in sequence, whereby an antiglare and antireflection film reduced in the planar failure such as streaked failure can be obtained.

The term "pitch" as used herein means a horizontal distance between peaks of adjacent surface asperities.

A representative example of the solvent for dissolving the triacetyl cellulose is dichloromethane. From the technical standpoint, halogenated hydrocarbon such as dichloromethane may be used without any problem, however, in view of the global environment or working environment, the solvent preferably contains substantially no halogenated hydrocarbon such as dichloromethane. The term "contain substantially no halogenated hydrocarbon" as used herein means that the percentage of halogenated hydrocarbon in the organic solvent is less than 5% by mass (preferably less than 2% by mass). In the case of preparing a triacetyl cellulose dope using a solvent containing substantially no dichloromethane or the like, a special dissolution method described later must be used.

A first dissolution method called cooling dissolution method is described below. In a solvent, triacetyl cellulose is gradually added while stirring at a temperature in the vicinity of room temperature (–10 to 40° C.). Thereafter, the mixture is cooled to –100 to –10° C. (preferably from –80 to –10° C., more preferably from –50 to –20° C., most preferably from –50 to –30° C.). The cooling may be performed in a dry ice methanol bath (–75° C.) or in a cooled diethylene glycol solution (–30 to –20° C.). As a result of cooling, the mixture of triacetyl cellulose and solvent is solidified. This is then heated to 0 to 200° C. (preferably from 0 to 150° C., more preferably from 0 to 120° C., most preferably from 0 to 50° C.) and thereby turns into a solution where triacetyl cellulose flows in the solvent. The temperature may be elevated by allowing the solidified mixture to stand at room temperature or may be elevated in a warm bath.

A second method called high-temperature dissolution method is described below. In a solvent, triacetyl cellulose is gradually added while stirring at a temperature in the vicinity of room temperature (–10 to 40° C.). The triacetyl cellulose solution for use in the present invention is preferably swelled in advance by adding triacetyl cellulose to a mixed solvent containing various solvents. In this method, the triacetyl cellulose is preferably dissolved to a concentration of 30% by mass or less, however, in view of the drying efficiency at the film formation, the concentration is preferably higher. Thereafter, the mixed solution of organic solvents is heated to 70 to 240° C. (preferably from 80 to 220° C., more preferably from 100 to 200° C., most preferably from 100 to 190° C.) under a pressure of 0.2 to 30 MPa. This heated solution cannot be coated as it is and must be cooled to a temperature lower than the lowest boiling point of the solvents used. In this case, the solution is generally cooled to –10 to 50° C. and returned to an atmospheric pressure. The cooling may be performed only by allowing the high-pressure high-temperature container or line housing the triacetyl cellulose solution to stand at room temperature or preferably, the apparatus may be cooled using a cooling medium such as cooling water.

In the case of using the antiglare and antireflection film of the present invention for a liquid display device, the antiglare and antireflection film is disposed on the outermost surface of a display by providing an adhesive layer on one surface. The triacetyl cellulose is used as a protective film for protecting the polarizing layer of a polarizer and therefore, it is preferred in view of the cost to use the antiglare and antireflection film of the present invention as the protective film as it is. The refractive index of triacetyl cellulose is 1.48. In the case of using the antiglare and antireflection film as the protective film of polarizing layer, the protective film is preferably subjected to a saponification treatment in view of the adhesive property. The antiglare and antireflection film of the present invention has saponification resistance and therefore, may be saponified immediately before attaching it to the protective film. The saponification treatment may be applied directly to the triacetyl cellulose film or may be performed after forming a hard coat layer or an antiglare layer. In view of the productivity, the saponification treatment is preferably performed after all layers are formed.

The antiglare and antireflection film of the present invention has an antiglare hard coat layer on a transparent support and further has a low refractive index layer thereon. If desired, a smooth hard coat layer may be provided as a lower layer of the antiglare hard coat layer.

In the present invention, the transparent support may be previously subjected to a saponification treatment.

The saponification treatment may also be performed after a hard coat layer is coated on the support, and thereafter, an antiglare layer and a low refractive index layer may be coated.

The saponification treatment may also be performed after all layers are coated. In any case, the effect of the present invention does not change and high effect can be attained.

The antiglare hard coat layer for use in the present invention is described below.

The antiglare hard coat layer is preferably formed from a binder for imparting hard coat property, mat particles for imparting antiglare property, and an inorganic filler for attaining high refractive index, reduced crosslinking shrinkage and high strength.

The binder is preferably a polymer having a saturated hydrocarbon chain or a polyether chain as the main chain, more preferably a polymer having a saturated hydrocarbon chain as the main chain.

The binder polymer also preferably has a crosslinked structure.

The binder polymer having a saturated hydrocarbon chain as the main chain is preferably a polymer of an ethylenically unsaturated monomer. The binder polymer having a saturated hydrocarbon chain as the main chain and having a crosslinked structure is preferably a (co)polymer of a monomer having two or more ethylenically unsaturated groups.

In order to have a high refractive index, the monomer preferably contains in the structure thereof at least one atom selected from the group consisting of halogen atoms (exclusive of fluorine), a sulfur atom, a phosphorus atom and a nitrogen atom.

Examples of the monomer having two or more ethylenically unsaturated groups include esters of polyhydric alcohol and (meth)acrylic acid (e.g., ethylene glycol di(meth)acrylate 1,4-dichlorohexane diacrylate, pentaerythritol tetra (meth)acrylate, pentaerythritol tri(meth)acrylate, trimethylolpropane tri (meth) acrylate, trimethylolethane tri (meth) acrylate, dipentaerythritol tetra(meth)acrylate, dipentaerythritol penta(meth)acrylate, dipentaerythritol hexa(meth) acrylate, 1,3,5-cyclohexanetriol triacrylate, polyurethane polyacrylate, polyester polyacrylate), vinyl benzene and derivatives thereof (e.g., 1,4-divinylbenzene, 4-vinylbenzoic acid-2-acryloylethyl ester, 1,4-divinylcyclohexanone), vinylsulfones (e.g., divinylsulfone), acrylamides (e.g., methylenebisacrylamide) and methacrylamide. Among these, (meth)acrylate-based monomers having three or more ethylenically unsaturated groups are preferred, and a mixture of dipentaerythritol pentaacrylate and dipentaerythritol hexaacrylate, which is commercially available, is more preferred.

Specific examples of the high refractive index monomer include bis(4-methacryloylthiophenyl) sulfide, vinyl naphthalene, vinylphenyl sulfide, 4-methacryloxyphenyl-4'-methoxyphenylthioether.

The polymerization of the monomer having ethylenically unsaturated groups may be performed under irradiation of ionizing radiation or under heat in the presence of a photoradical polymerization initiator or heat-radical polymerization initiator.

Accordingly, the antiglare and antireflection film can be formed by preparing a coating solution containing a monomer having ethylenically unsaturated groups, a photo- or heat-radical polymerization initiator, mat particles and an inorganic filler, applying the coating solution to a transparent support, and curing the coating solution through a polymerization reaction under ionizing radiation or heat.

The polymer having a polyether as the main chain is preferably a ring-opening polymer of a polyfunctional epoxy compound. The ring-opening polymerization of a polyfunctional epoxy compound can be performed under irradiation of ionizing radiation or under heat in the presence of a photoacid generator or a heat-acid generator.

Accordingly, the antiglare and antireflection film can be formed by preparing a coating solution containing a polyfunctional epoxy compound, a photoacid generator or heat-acid generator, mat particles and an inorganic filler, applying the coating solution to a transparent support and curing the coating solution through a polymerization reaction under ionizing radiation or heat.

In place of or in addition to the monomer having two or more ethylenically unsaturated groups, a monomer having a crosslinkable functional group may be used, so that the crosslinkable functional group can be introduced into the polymer and by a reaction of this crosslinkable functional group, a crosslinked structure can be introduced into the binder polymer.

Examples of the crosslinkable functional group include an isocyanate group, an epoxy group, an aziridine group, an oxazoline group, an aldehyde group, a carbonyl group, a hydrazine group, a carboxyl group, a methylol group and an active methylene group. Also, a vinylsulfonic acid, an acid anhydride, a cyanoacrylate derivative, a melamine, an etherified methylol, an ester, an urethane or a metal alkoxide such as tetramethoxysilane can be used as a monomer for introducing a crosslinked structure. A functional group which exhibits crosslinking property as a result of the decomposition reaction, such as block isocyanate group, may also be used. In other words, the crosslinkable functional group for use in the present invention may be a group which does not directly cause a reaction but exhibits reactivity after the decomposition.

The binder polymer having this crosslinkable functional group is coated and then heated, whereby a crosslinked structure can be formed.

The antiglare hard coat layer contains mat particles, for example, inorganic compound particles or resin particles, having an average particle size of 1.0 to 10.0 $\mu$m, preferably from 1.5 to 7.0 $\mu$m, so as to impart antiglare property.

Specific examples of the mat particle include silica particle, inorganic compound particle such as $TiO_2$ particle, and resin particle such as crosslinked acrylic particle, crosslinked styrene particle, melamine resin particle and benzoguanamine resin particle. Among these, crosslinked styrene particle is preferred.

The shape of the mat particle may be either true spherical or amorphous.

Furthermore, two or more kinds of different mat particles may be used in combination.

The mat particle is incorporated into the antiglare hard coat layer such that the amount of the particles in the formed antiglare hard coat layer is preferably from 10 to 1,000 mg/m$^2$, more preferably from 30 to 100 mg/m$^2$.

In a more preferred embodiment, crosslinked styrene particle is used as the mat particle and crosslinked styrene particles having a particle size larger than 1/2 of the layer thickness of the antiglare hard coat layer occupy from 40 to 100% of all crosslinked styrene particles. The particle size distribution of mat particles is measured by a Coulter counter and the measured distribution is calculated into a particle number distribution.

For the purpose of imparting antiglare property, preventing worsening of the reflectance due to interference with the hard coat layer or preventing irregular color, the mat particle for use in the antiglare hard coat layer is preferably a transparent mat particle satisfying the following conditions (i) to (iii) with respect to the particle size distribution.

(i) The number average particle size measured by the Coulter method is from 1.7 to 3.5 $\mu$m, preferably from 1.8 to 2.2 $\mu$m.

If number average particle size is less than 1.7 $\mu$m, the antiglare property is deficient, whereas if it exceeds 3.5 $\mu$m, the clearness of transmitted image decreases.

(ii) The standard deviation of the particle size is 25% or less, preferably 20% or less, of said number average particle size.

If the standard deviation exceeds 25%, the coating form of the binder for individual mat particles becomes non-uniform and desired surface asperities cannot be formed.

(iii) Coarse particles having a particle size 3.0 $\mu$m or more larger than the number average particle size or coarse particles 2.5 times or more larger than the number average particle size are contained in a proportion of less than 5 particles/$1\times10^8$ particles, preferably less than 5 particles/$1\times$ $10^9$ particles. These coarse particles are most preferably not contained at all in the antiglare and antireflection film of the present invention, because these work out to nuclei of grain-like planar failures.

If the proportion of these coarse particles exceeds 5 particles/$1\times10^8$ particles, the number of grain-like failures per 1 $m^2$ surpasses the tolerance level and the production yield of the antiglare and antireflection film of the present invention disadvantageously decreases.

In view of the particle size distribution and the refractive index, the mat particle for use in the antiglare hard coat layer is preferably a crosslinked styrene particle.

In order to increase the refractive index of the antiglare hard coat layer, the layer preferably contains an inorganic filler comprising an oxide of at least one metal selected from the group consisting of titanium, zirconium, aluminum, indium, zinc, tin and antimony and having an average particle size of 0.001 to 0.2 $\mu$m, preferably from 0.001 to 0.1 $\mu$m, more preferably from 0.001 to 0.06 $\mu$m, in addition to the above-described mat particle.

Specific examples of the inorganic filler for use in the antiglare hard coat layer include $TiO_2$, $ZrO_2$, $Al_2O_3$, $In_2O_3$, ZnO, $SnO_2$, $Sb_2O_3$ and ITO. Among these, $TiO_2$ and $ZrO_2$ are preferred in view of high refractive index. The surface of the inorganic filler is preferably subjected to a silane coupling treatment or a titanium coupling treatment. A surface treating agent having a functional group capable of reacting the binder species on the filler surface is preferably used.

The amount of the inorganic filler added is preferably from 10 to 90%, more preferably from 20 to 80%, still more preferably from 30 to 75%, based on the entire mass of the antiglare hard coat layer.

In particular, the antiglare hard coat layer is preferably an antiglare hard coat layer formed by curing a composition containing a mixture of dipentaerythritol pentaacrylate and dipentaerythritol hexaacrylate and a $ZrO_3$ inorganic filler, with ultraviolet, where crosslinked polystyrene particles are dispersed in a binder.

The total refractive index of the mixture of binder and inorganic filler in the antiglare hard coat layer of the present invention is preferably from 1.57 to 2.00, more preferably from 1.60 to 1.80. The refractive index can be controlled to fall within this range by appropriately selecting the kind and the amount ratio of the binder and the inorganic filler. The kind and amount ratio can be easily known by previously performing an experiment.

The refractive index of the binder for forming the antiglare hard coat layer is preferably from 1.57 to 2.00, more preferably from 1.60 to 1.80. If the refractive index of the binder is too small, the antireflection property decreases, whereas if it is excessively large, the color of reflected light of the antiglare and antireflection film of the present invention is disadvantageously intensified.

The antiglare hard coat layer preferably has a haze value of 5 to 15%. The antiglare property does not always linearly correspond to the haze value, however, if the haze value is less than 5%, the antiglare film obtained cannot have sufficiently high antiglare property, whereas if the haze value exceeds 15%, too strong scattering takes place on the surface or in the inside and this disadvantageously causes reduction in the clearness of image or problems such as whitening.

In the antiglare hard coat layer of the present invention, light scattering occurs due to the surface asperities attributable to the mat particles dispersed in a high refractive index material and therefore, the antiglare hard coat layer is free of an effect by optical interference. If the high refractive index hard cot layer does not contain mat particles, the dependency of reflectance on the wavelength greatly fluctuate due to the optical interference caused by the difference in the refractive index between the hard coat layer and the support, as a result, the antireflection effect decreases and at the same time, irregular color is generated. In the antireflection film of the present invention, these problems are not caused by virtue of the scattering effect of surface asperities on the antiglare hard coat layer.

The thickness of the antiglare hard coat layer is preferably from 1 to 10 $\mu$m, more preferably from 1.2 to 6 $\mu$m.

In the antiglare and antireflection film of the present invention, a smooth hard coat layer is provided, if desired, between the transparent support and the antiglare hard coat layer so as to improve the film strength.

The construction materials for use in the smooth hard coat layer are the same as those described in the antiglare hard coat layer except that mat particle for imparting antiglare property is not used. The smooth hard coat layer is preferably formed from a binder and an inorganic filler.

The inorganic filler for use in the smooth hard coat layer of the present invention is preferably silica or alumina in view of the strength and the general use property. In particular, silica is preferred. The surface of the inorganic filler is preferably subjected to a silane coupling treatment and a surface treating agent having a functional group capable of reacting with a binder species on the filler surface is preferably used.

The amount of the inorganic filler added is preferably from 10 to 90%, more preferably from 20 to 80%, still more preferably from 30 to 75%, based on the total mass of the hard coat layer.

The thickness of the smooth hard coat layer is preferably from 1 to 10 $\mu$m, more preferably from 1.2 to 6 $\mu$m.

The low refractive index layer for use in the present invention is described below. In the case of coating the low refractive index layer on the antiglare layer, the low refractive index layer may be coated on the antiglare layer directly or through another layer. The low refractive index layer of the antiglare and antireflection film of the present invention has a refractive index of 1.38 to 1.49, preferably from 1.38 to 1.44. If the refractive index exceeds 1.49, the antiglare and antireflection film increases in the reflectance and deteriorates in the antireflection function.

Furthermore, from the standpoint of obtaining low reflectance, the low refractive index layer preferably satisfies the following equation (I):

$$m\lambda/4 \times 0.7 < n_1 d_1 < m\lambda/4 \times 1.3 \qquad (I)$$

wherein m represents a positive odd number (generally 1), $n_1$ represents a refractive index of the low refractive index layer, $d_1$ represents a thickness (nm) of the low refractive index layer, and $\lambda$ represents a designed wavelength in the antireflection design and is a value of 500 to 550 (nm).

To satisfy equation (I) means that m (positive odd number, usually 1) satisfying equation (I) is present in the above-described wavelength range.

The construction material for forming the low refractive index layer of the present invention is described below.

The present invention is characterized by the boiling point of the solvent and the composition of coating solution used for forming the low refractive index layer. The solvent may be one solvent alone or may comprise a combination of two or more solvents.

In the case of using one kind of solvent alone, the boiling point of the solvent is 100° C. or less, preferably from 50 to 95° C.

In the case of using two or more in combination, a solvent having a boiling point of 100° C. or less, preferably from 50 to 95° C. occupies from 50 to 100% by mass, preferably from 80 to 100% by mass, more preferably from 90 to 100% by mass, still more preferably 100% by mass, of the entire solvent.

In the case where one kind of solvent is used alone and the boiling point of the solvent exceeds 100° C. or where two or more kinds of solvents are used in combination and a solvent having a boiling point of 100° C. or less occupies less than 50% by mass, the drying proceeds at a very slow speed and the layer coated becomes uneven in the thickness and deteriorates in the optical properties such as reflectance.

In the present invention, this problem is overcome by using a coating solution comprising only a low boiling point solvent having a boiling point of 100° C. or less or even when a high boiling point solvent which may be contained is used, by using a coating solution containing a low boiling point solvent in a larger amount.

Examples of the solvent having a boiling point of 100° C. or less include hydrocarbons such as hexane (boiling point: 68.7° C.), heptane (98.4° C.), cyclohexane (80.7° C.) and benzene (80.1° C.), halogenated hydrocarbons such as dichloromethane (39.8° C.), chloroform (61.2° C.), carbon tetrachloride (76.8° C.), 1,2-dichloroethane (83.5° C.) and trichloroethylene (87.2° C.), ethers such as diethyl ether (34.6° C.), diisopropyl ether (68.5° C.), dipropyl ether (90.5° C.) and tetrahydrofuran (66° C.), esters such as ethyl formate (54.2° C.), methyl acetate (57.8° C.), ethyl acetate (77.1° C.) and isopropyl acetate (89° C.), ketones such as acetone (56.1° C.) and 2-butanone (same as methyl ethyl ketone, 79.6° C.), alcohols such as methanol (64.5° C.), ethanol (78.3° C.), 2-propanol (82.4° C.) and 1-propanol (97.2° C.), cyano compounds such as acetonitrile (81.6° C.) and propionitrile (97.4° C.), and carbon disulfide (46.2° C.). Among these, ketones and esters are preferred, and ketones are more preferred. Among ketones, 2-butanone is preferred.

Examples of the solvent having a boiling point of 100° C. or more include octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (same as MIBK, 115.9° C.), 1-butanol (117.7° C.), N,N-dimethylformamide (153° C.), N,N-dimethylacetamide (166° C.) and dimethylsulfoxide (189° C.). Among these, cyclohexanone and 2-methyl-4-pentanone are preferred.

In view of antifouling property and scratch resistance, the low refractive index binder for use in the low refractive index layer is preferably a fluorine-containing compound having kinetic coefficient of friction of 0.03 to 0.15 and a contact angle to water of 90 to 120° and capable of crosslinking by heat or ionizing radiation. The low refractive index binder may be used in combination with another compound so as to control the coatability, the film hardness and the like. Inorganic fine particle is also preferably added for the purpose of increasing the film strength. By diluting these components for the low refractive index layer with a solvent having the above-described composition, the coating solution for low refractive index layer for use in the present invention is prepared. An appropriate concentration of the coating solution is preferably controlled by taking account of the viscosity of coating solution and the specific gravity of the construction material of the low refractive index layer, however, the concentration is preferably from 0.1 to 20% by mass, more preferably from 1 to 10% by mass.

Examples of the crosslinkable fluorine-containing polymer for use in the low refractive index layer include perfluoroalkyl group-containing alkoxysilane compounds (e.g., (heptadecafluoro-1,1,2,2-tetradecyl)triethoxysilane) and fluorine-containing copolymers using a fluorine-containing monomer having a carbon—carbon double bond and a monomer for imparting a crosslinkable group as the constituent units.

Specific examples of the fluorine-containing monomer unit include fluoroolefins (e.g., fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid (e.g., BISCOTE 6FM (produced by Osaka Yuki Kagaku), M-2020 (produced by Daikin)), and completely or partially fluorinated vinyl ethers.

Examples of the monomer for imparting a crosslinkable group include (meth)acrylate monomers having a crosslinkable functional group within the molecule, such as glycidyl methacrylate, and (meth)acrylate monomers having a carboxyl group, a hydroxyl group, an amino group or a sulfonic acid group, such as (meth)acrylic acid, methylol (meth) acrylate, hydroxyalkyl (meth) acrylate and allyl acrylate. In the latter case, a crosslinked structure can be introduced after the copolymerization and this is disclosed in JP-A-10-25388 and JP-A-10-147739.

Not only the polymer using the above-described fluorine-containing monomer and the monomer for imparting a crosslinkable group as constituent units but also a copolymer with a monomer not containing a fluorine atom may be used. The monomer unit which can be used in combination is not particularly limited and examples thereof include olefins (e.g., ethylene, propylene, isoprene, vinyl chloride, vinylidene chloride), acrylic acid esters (e.g., methyl acrylate, ethyl acrylate, 2-ethylhexyl acrylate), methacrylic acid esters (e.g., methyl methacrylate, ethyl methacrylate, butyl methacrylate, ethylene glycol dimethacrylate) styrene derivatives (e.g., styrene, divinylbenzene, vinyltoluene, α-methylstyrene), vinyl ethers (e.g., methyl vinyl ether), vinyl esters (e.g., vinyl acetate, vinyl propionate, vinyl cinnamate), acrylamides (e.g., N-tert-butylacrylamide, N-cyclohexylacrylamide), methacrylamides and acrylonitrile derivatives. In addition, from the standpoint of attaining low refractive index, slippage and antifouling effect at the same time, commercially available products JN-7219, JN-7221 and JN-7225 (all produced by JSR K.K.) which have slipping property are preferred.

The inorganic fine particle for use in the low refractive index layer preferably has a low refractive index and preferred examples of the inorganic fine particle include silica and magnesium silica, with silica being more preferred.

In the low refractive index layer, silicon oxide fine particle for imparting scratch resistance is preferably used in combination with the fluorine-containing resin. In view of antireflection property, the refractive index is preferably lower, however, as the refractive index of the fluorine-containing resin becomes lower, the scratch resistance changes for the worse. The point giving the best balance between the scratch resistance and the low refractive index can be found by optimizing the refractive index of fluorine-containing resin and the amount of silicon oxide fine particle used.

The silicon oxide fine particle may be used by adding a commercially available silica sol dispersed in an organic solvent as it is to the coating solution for forming the low refractive index layer or by dispersing a commercially available silica powder of various types in an organic solvent and adding the dispersion to the coating solution for forming the low refractive index layer.

The average particle size of the inorganic fine particles is preferably from 0.001 to 0.2 μm, more preferably from 0.001 to 0.05 μm. The inorganic fine particles are preferably uniform in the particle size (monodisperse).

The amount of the inorganic fine particles blended is preferably from 5 to 90% by mass, more preferably from 10 to 70% by mass, still more preferably from 10 to 50% by mass, based on the entire mass of the low refractive index layer.

The inorganic fine particle is also preferably surface-treated before use. The surface treatment includes a physical surface treatment such as plasma discharge treatment and corona discharge treatment, and a chemical surface treatment using a coupling agent. A chemical surface treatment using a coupling agent is preferred. The coupling agent used is preferably an organoalkoxy metal compound (e.g., titanium coupling agent, silane coupling agent). In the case where the inorganic fine particle is silica, a treatment with a silane coupling agent is particularly effective.

The hard coat layer which is provided, if desired, is described below.

Figure 2:
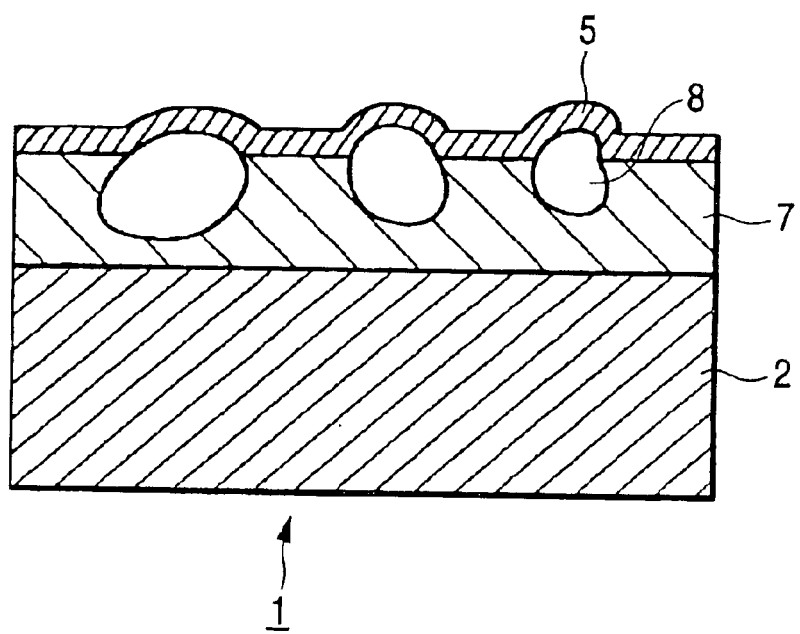
FIG. 2 is a schematic cross-sectional view showing the layer structure of an antiglare and antireflection film.

FIG. 2 is a view showing one embodiment of the antiglare film having excellent dust-protecting property (prevention of dusts from sticking) of the present invention. The antiglare film has a layer structure of a transparent support 2, an antiglare layer 7 and a low refractive index layer 5 in this order. The antiglare layer may serve also as a hard coat layer but a hard coat layer may be provided under the antiglare layer.

Antiglare particles 8 are dispersed in the antiglare layer 7 and since particles larger than ½ of the thickness of the antiglare layer 7 preferably occupy from 40 to 100% of the antiglare particles, asperities can be formed on the surface of antiglare layer to impart antiglare property.

As such, the antiglare and antireflection film having excellent dust-protecting property (prevention of dusts from sticking) of the present invention has a fundamental structure such that an antiglare layer comprising a binder and antiglare particles and having a refractive index of preferably from 1.57 to 2.00 and a low refractive index layer having a refractive index of preferably from 1.38 to 1.49 are provided on a transparent support. In addition to these antiglare layer and low refractive index layer, one or more layer having a refractive index higher than that of the transparent support and one or more layer having a refractive index lower than that of the transparent support may also be provided.

Examples of the method for imparting the antiglare property to the antiglare layer include a method described in JP-A-61-209154 where an irregular layer prepared by adding particles to a binder is coated on a transparent support, a method described in JP-A-6-16851 where a film having previously formed thereon an irregular surface is laminated on the coating layer of a transparent support to transfer the asperities, and a method of forming asperities by embossing a transparent support directly or through another layer such as hard coat layer.

Among these, a method of adding particles to a binder and thereby forming asperities is preferred because the production is simple and stable.

The antiglare and antireflection film having excellent dust-protecting property (prevention of dusts from sticking) of the present invention is characterized in that the vertical release charge measured at an ordinary temperature and an ordinary humidity with triacetyl cellulose (TAC) or polyethylene terephthalate (PET) is from −200 to +200 pc (picocoulomb)/cm$^2$, preferably from −100 to +100 pc/cm$^2$, more preferably from −50 to +50 pc/cm$^2$, most preferably 0 pc/cm$^2$. The unit pc (picocoulomb) as used herein is $10^{-12}$ coulomb.

Furthermore, the vertical release charge measured at an ordinary temperature and 10% RH is preferably from −100 to +100 pc/cm$^2$, more preferably from −50 to +50 pc/cm$^2$, most preferably 0 pc/cm$^2$.

The method for measuring the vertical release charge is described below.

A measurement sample is previously left standing for 2 hours or more in an environment of measurement temperature and humidity. The measuring apparatus comprises a table on which the measurement sample is placed, and a head for holding the other party film. The head can repeat the pressing from above to the measurement sample and the releasing therefrom. This head is connected with an electrometer for measuring the charge amount. An antiglare and antireflection film to be measured is placed on the table and TAC or PET is fixed to the head. After removing electricity from the measuring part, the head is repeatedly pressed to and released from the measurement sample. The charge value is read at the first release and at the fifth release and the obtained values are averaged. By varying the sample, this operation is repeated on three samples. All values are averaged and the obtained value is used as the vertical release charge.

Depending on the other part film or the kind of measurement sample, positive charging or negative charging may occur but the matter of importance is the size of absolute value.

In general, the absolute value of charge is larger in an environment of lower humidity. The antiglare and antireflection film of the present invention is small also in this absolute value.

The antiglare and antireflection film of the present invention is small in the absolute value of vertical release charge at an ordinary temperature and an ordinary humidity and at an ordinary temperature and 10%. RH and therefore, exhibits excellent dust-protecting property.

The vertical release charge value is controlled to fall within the above-described range by adjusting the proportion among various elements on the surface of the antiglare and antireflection film.

The antiglare and antireflection film having excellent dust-protecting property (prevention of dust from sticking) of the present invention has a surface resistivity of $1\times10^{11}$ Ω/□ or more, preferably $1\times10^{12}$ Ω/□ or more. The surface resistivity is measured by a circular electrode method described in JIS. More specifically, a current value is read 1 minute after the application of voltage and the surface resistivity (SR) is determined.

The present invention is fundamentally different in the way of thinking from the method of improving the dust-protecting property (prevention of dusts from sticking) by decreasing the surface resistivity, for example, to $1\times10^{10}$ Ω/□ or less. This method causes lowering in the quality of image display and is not employed. In the present invention, the absolute value of vertical release charge is lowered by the above-described method, so that the surface resistivity needs not be reduced, the surface resistivity can be made $1\times10^{11}$ Ω/□ or more and the quality of image display can be prevented from decreasing.

The antiglare and antireflection film of the present invention can be formed by the following method, however, the present invention is not limited to this method.

Coating solutions containing components for forming respective layers are prepared. The coating solution for forming an antiglare hard coat layer is coated on a transparent support by the dip coating method, air knife coating method, curtain coating method, roller coating method, wire bar coating method, gravure coating method, microgravure coating method or extrusion coating method (see, U.S. Pat. No. 2,681,294), and then heated and dried. The formed coating is irradiated with light or heated to polymerize the monomer for forming the antiglare hard coat layer and cure the polymer, whereby an antiglare hard coat layer is formed.

If desired, before the coating of the antiglare hard coat layer, a smooth had coat layer may be coated and cured in the same manner.

Thereafter, the coating solution for forming a low refractive index layer is coated on the antiglare hard coat layer in the same manner and irradiated with light or heated to form a low refractive index layer.

In this way, the antiglare and antireflection film of the present invention is obtained.

Two or more layers of the antiglare and antireflection film of the present invention may be simultaneously coated. The simultaneous coating method is described in U.S. Pat. Nos. 2,761,791, 2,941,898, 3,508,947 and 3,526,528, and Yuji Harasaki, *Coating Kogaku* (*Coating Engineering*), page 253, Asakura Shoten (1973).

The thickness of the antiglare hard coat layer constituting the antiglare and antireflection film of the present invention is usually from 1 to 5 μm, the thickness of the low refractive index layer is usually from 80 to 120 nm, and the thickness of the hard coat layer is usually from 0.5 to 6 μm.

The thus-formed antiglare and antireflection film of the present invention has a haze value of from 3.0 to 20.0%, preferably from 4.0 to 15.0%, and an average reflectance at 450 to 650 nm of 1.8% or less, preferably 1.5% or less.

The antiglare and antireflection film of the present invention has a haze value and an average reflectance within those ranges, whereby good antiglare property and high antireflection can be obtained without causing any deterioration of the transmitted image.

The polarizer of the present invention uses the above-described antiglare and antireflection film for at least one sheet of two protective films of the polarizing layer. By using the antiglare and antireflection film of the present invention as the outermost surface layer, the polarizer obtained can be prevented from reflection of the outer light and favored with high scratch resistance and excellent antifouling property. In the polarizer of the present invention, the antiglare and antireflection film serves also as a protective film, so that the production cost can be reduced.

The antiglare and antireflection film of the present invention can be applied to image display devices such as liquid crystal display device (LCD), plasma display panel (PDP), electroluminescence display (ELD) and cathode ray tube display device (CRT). Since the antiglare and antireflection film of the present invention has a transparent support, this film is used by adhering the transparent support side to the image display surface of an image display device. In the case of applying the antiglare and antireflection film of the present invention to the surface or inner surface of LCD, this film is preferably used as it is for one film sheet out of two protective film sheets of protecting the polarizing layer of the polarizer.

The antiglare and antireflection film of the present invention can be formed by a coating method, can be excellent in the antireflection property, antifouling property, scratch resistance and clearness of transmitted image and can be favored with superior planar uniformity. This excellent antiglare and antireflection film can be applied to image display devices such as liquid crystal display device (LCD), plasma display panel (PDP), electroluminescence display (ELD) and cathode ray tube display device (CRT).

The liquid display device where a polarizer using the antiglare and antireflection film of the present invention as a protective film is disposed for the outermost layer is ensured with good contrast due to no reflection of exterior light and by virtue of antiglare property, excellent visibility without showing a reflected image and also favored with good planar state.

The antiglare and antireflection film of the present invention has excellent dust-protecting property (prevention of dusts from sticking) and small reflectance. The image display device having a polarizer using such an excellent antiglare and antireflection film can be favored with both dust-protecting property and antiglare property (visibility) which cannot be attained at the same time in conventional techniques.

The antiglare and antireflection film of the present invention exhibits excellent effect in the antireflection performance, antifouling property and scratch resistance and can be simply and inexpensively produced only by forming an antiglare hard coat layer and a low refractive index layer on a support.

The polarizer and the liquid crystal display device using this antiglare and antireflection film are satisfactorily prevented from reflection of outer light and exhibits excellent antifouling property and high scratch resistance.

The low refractive index layer formed from the coating solution for low refractive index layer of the present invention ensures good planar state at coating and uniform thickness of the coated layer, so that an antiglare and antireflection film excellent in the reflectance, haze and antiglare property can be obtained.

The antiglare and antireflection film of the present invention can be obtained by an all-wet coating method and therefore, is excellent in various performances such as antireflection property, antifouling property, scratch resistance and clearness of transmitted image, and moreover, excellent in the planar uniformity.

The liquid crystal display device having a polarizer using this excellent antiglare and antireflection film ensures good contrast due to no reflection of outer light, excellent visibility without showing a reflected image by virtue of antiglare property, high clearness of image and good planar state. The liquid crystal display device directly using the antiglare and antireflection film has similar effects.

The present invention is described in greater detail below by referring to the Examples, however, the present invention should not be construed as being limited thereto.

(Preparation of Coating Solution for Hard Coat Layer)

In a solution containing 62 g of methyl ethyl ketone and 88 g of cyclohexanone, 250 g of an ultraviolet curable hard coat composition (DESOLITE Z-7526, 72 wt %, produced by JSR K.K.) was dissolved. The coating obtained by coating and UV-curing this solution had a refractive index of 1.50.

This solution was further filtered through a polypropylene-made filter (PPE-30) having a pore size of 30 μm to prepare a coating solution for hard coat layer.

(Preparation of Coating Solution A for Antiglare Hard Coat Layer)

To 278 g of a commercially available zirconium-containing UV curable hard coat solution (DESOLITE Z-7401, produced by JSR, solid concentration: 48%, zirconia content: 71%, average particle size: about 20 nm), 117 g of a mixture of dipentaerythritol pentaacrylate and dipentaerythritol hexaacrylate (DPHA, produced by Nippon Kayaku K.K.) and 7.5 g of a photopolymerization initiator (Irgacure 907, produced by Ciba Specialty Chemicals Inc.) were added and the resulting solution was diluted with 355 g of a mixed solvent of methyl ethyl ketone/cyclohexanone (=50/50 in % by weight). The coating obtained by coating and UV-curing this solution had a refractive index of 1.61.

To this solution, 10 g of crosslinked polystyrene particles having an average particle size of 2 $\mu$m (SX-200H, a trade name, produced by Soken Kagaku K.K.) were added and dispersed with stirring at 5,000 rpm for 1 hour using a high-speed disperser. The resulting solution was filtered through a polypropylene-made filter having a pore size of 30 $\mu$m to prepare Coating Solution A for antiglare hard coat layer.

(Preparation of Coating Solution B for Antiglare Hard Coat Layer)

In 52 g of a mixed solvent of methyl ethyl ketone/cyclohexanone (=54/46 in % by weight), 91 g of a mixture of dipentaerythritol pentaacrylate and dipentaerythritol hexaacrylate (DPHA, produced by Nippon Kayaku K.K.) and 218 g of a hard coat coating solution containing zirconium oxide fine particles having a particle size of about 30 n=(DESOLITE Z-7401, produced by JSR K.K.) were dissolved. To the resulting solution, 10 g of a photopolymerization initiator (Irgacure 907, produced by Ciba Fine Chemicals K.K.) was added. The coating obtained by coating and UV-curing this solution had a refractive index of 1.61.

To this solution, 29 g of a dispersion solution (the proportion of coarse particles of 5.0 $\mu$m or more is 0 particles/$1\times10^{10}$ particles) obtained by dispersing 20 g of crosslinked polystyrene particles (SX-200HS (pneumatic classification product of SX-200H), produced by Soken Kagaku K.K.) having a number average particle size of 1.99 $\mu$m and a standard deviation of particle size of 0.32 $\mu$m (16% of number average particle size) in 80 g of a mixed solvent of methyl ethyl ketone/cyclohexanone (54/46 in % by weight) with stirring at 5,000 rpm for 1 hour using a high-speed disperser and then filtering the resulting solution through a polypropylene-made filter having a pore size of 10 $\mu$m, 3 $\mu$m and 1 $\mu$m (PPE-10, PPE-03 and PPE-01, all produced by Fuji Photo Film Co., Ltd.), was added and stirred. The resulting solution was filtered through a polypropylene-made filter having a pore size of 30 $\mu$m to prepare Coating Solution B for antiglare hard coat layer.

(Preparation of Coating Solution A for Low Refractive Index Layer)

To 210 g of a heat-crosslinkable fluorine-containing polymer having a refractive index of 1.42 (JN-7228, MEK solution having a solid concentration of 6%, produced by JSR K.K.), 15.2 g of silica sol (MEK-ST, average particle size: 10 to 20 nm, a MEK dispersion having a solid concentration of 30%, produced by Nissan Chemical) and 174 g of MEK (same as 2-butanone) were added and stirred. Thereafter, the resulting solution was filtered through a polypropylene-made filter having a pore size of 1 $\mu$m to prepare Coating Solution A for low refractive index layer. The content of solvent having a boiling point of 100° C. or less in the solvent of this coating solution was 100% by mass.

(Preparation of Coating Solution B for Low Refractive Index Layer)

To 210 g of a heat-crosslinkable fluorine-containing polymer having a refractive index of 1.42 (JN-7228, MEK solution having a solid concentration of 6%, produced by JSR K.K.), 15.2 g of silica sol (MEK-ST, average particle size: 10 to 20 nm, a MEK dispersion having a solid concentration of 30%, produced by Nissan Chemical), 155 g of MEK (same as 2-butanone) and 19 g of cyclohexanone were added and stirred. Thereafter, the resulting solution was filtered through a polypropylene-made filter having a pore size of 1 $\mu$m to prepare Coating Solution B for low refractive index layer. The content of solvent having a boiling point of 100° C. or less in the solvent of this coating solution was 95% by mass.

(Preparation of Coating Solution C for Low Refractive Index Layer)

To 210 g of a heat-crosslinkable fluorine-containing polymer having a refractive index of 1.42 (JN-7228, MEK solution having a solid concentration of 6%, produced by JSR K.K.), 15.2 g of silica sol (MEK-ST, average particle size: 10 to 20 nm, a MEK dispersion having a solid concentration of 30%, produced by Nissan Chemical), 97.6 g of MEK (same as 2-butanone) and 76.4 g of cyclohexanone were added and stirred. Thereafter, the resulting solution was filtered through a polypropylene-made filter having a pore size of 1 $\mu$m to prepare Coating Solution C for low refractive index layer. The content of solvent having a boiling point of 100° C. or less in the solvent of this coating solution was 80% by mass.

(Preparation of Coating Solution D for Low Refractive Index Layer)

To 210 g of a heat-crosslinkable fluorine-containing polymer having a refractive index of 1.42 (JN-7228, MEK solution having a solid concentration of 6%, produced by JSR K.K.), 15.2 g of silica sol (MEK-ST, average particle size: 10 to 20 nm, a MEK dispersion having a solid concentration of 30%, produced by Nissan Chemical), 21.2 g of MEK (same as 2-butanone) and 152.8 g of cyclohexanone were added and stirred. Thereafter, the resulting solution was filtered through a polypropylene-made filter having a pore size of 1 $\mu$m to prepare Coating Solution C for low refractive index layer. The content of solvent having a boiling point of 100° C. or less in the solvent of this coating solution was 60% by mass.

(Preparation of Coating Solution E for Low Refractive Index Layer)

To 210 g of a heat-crosslinkable fluorine-containing polymer having a refractive index of 1.42 (JN-7228, MEK solution having a solid concentration of 6%, produced by JSR K.K.), 15.2 g of silica sol (MEK-ST, average particle size: 10 to 20 nm, a MEK dispersion having a solid concentration of 30%, produced by Nissan Chemical) and 174 g of ethyl acetate were added and stirred. Thereafter, the resulting solution was filtered through a polypropylene-made filter having a pore size of 1 $\mu$m to prepare Coating Solution E for low refractive index layer. The content of solvent having a boiling point of 100° C. or less in the solvent of this coating solution was 100% by mass.

(Preparation of Coating Solution F for Low Refractive Index Layer; for Comparison)

To 210 g of a heat-crosslinkable fluorine-containing polymer having a refractive index of 1.41 (JN-7219, a solution having a solid concentration of 6%, boiling point of solvent: 100° C. or more, produced by JSR K.K.), 15.2 g of silica sol (MIBK-ST, average particle size: 10 to 20 nm, a MIBK dispersion having a solid concentration of 30%, produced by Nissan Chemical) and 174 g of MIBK (same as 2-methyl-4-pentanone) were added and stirred. Thereafter, the resulting solution was filtered through a polypropylene-made filter having a pore size of 1 $\mu$m to prepare Coating Solution F for low refractive index layer. The content of solvent having a boiling point of 100° C. or less in the solvent of this coating solution was 0% by mass.

(Preparation of Coating Solution G for Low Refractive Index-Layer; for Comparison)

A heat-crosslinkable fluorine-containing silica sol having a refractive index of 1.38 (LR201, produced by Nissan Chemical, solvent: ethanol/butyl cellosolve (50/50)) was filtered through a polypropylene-made filter having a pore size of 1 $\mu$m to prepare Coating Solution G for low refractive index layer.

EXAMPLE 1

Coating Solution A for antiglare hard coat layer prepared above was coated on a 80 $\mu$m-thick triacetyl cellulose film (TAC-TD80U, produced by Fuji Photo Film Co., Ltd.) using a bar coater and dried at 120° C. Thereafter, ultraviolet was irradiated thereon at an illuminance of 400 mW/cm$^2$ and a dose of 300 mJ/cm$^2$ using an air cooled metal halide lamp of 160 W/cm (manufactured by I-Graphics K.K.) to cure the coating layer and thereby form an antiglare hard coat layer having a thickness of 2.5 $\mu$m.

Further thereon, Coating Solution A for low refractive index layer prepared above was coated using a bar coater, dried at 80° C. and then cross-linked under heat at 120° C. for 10 minutes to form a low refractive index layer having a thickness of 0.096 $\mu$m.

EXAMPLE 2

A sample was prepared in the same manner as in Example 1 except that the coating solution for low refractive index layer was changed to Coating Solution B for low refractive index layer.

EXAMPLE 3

A sample was prepared in the same manner as in Example 1 except that the coating solution for low refractive index layer was changed to Coating Solution C for low refractive index layer.

EXAMPLE 4

A sample was prepared in the same manner as in Example 1 except that the coating solution for low refractive index layer was changed to Coating Solution D for low refractive index layer.

EXAMPLE 5

A sample was prepared in the same manner as in Example 1 except that the coating solution for low refractive index layer was changed to Coating Solution E for low refractive index layer.

COMPARATIVE EXAMPLE 1

A sample was prepared in the same manner as in Example 1 except that the coating solution for low refractive index layer was changed to Coating Solution F for low refractive index layer.

EXAMPLE 6

The coating solution for hard coat layer prepared above was coated on a 80 $\mu$m-thick triacetyl cellulose film (TAC-TD80U, produced by Fuji Photo Film Co., Ltd.) using a bar coater and dried at 120° C. Thereafter, ultraviolet was irradiated thereon at an illuminance of 400 mW/cm$^2$ and a dose of 300 mJ/cm$^2$ using an air cooled metal halide lamp of 160 W/cm (manufactured by I-Graphics K.K.) to cure the coating layer and thereby form a hard coat layer having a thickness of 2.5 $\mu$m.

On the thus-formed hard coat layer, Coating Solution A for antiglare hard coat layer prepared above was coated using a bar coater and under the same conditions as in the formation of hard coat layer above, dried and UV-cured to form an antiglare hard coat layer having a thickness of about 1.5 $\mu$m.

Further thereon, Coating Solution A for low refractive index layer prepared above was coated using a bar coater, dried at 80° C. and then crosslinked under heat at 120° C. for 10 minutes to form a low refractive index layer having a thickness of 0.096 $\mu$m.

EXAMPLE 7

A sample was prepared in the same manner as in Example 6 except that the coating solution for low refractive index layer was changed to Coating Solution B for low refractive index layer.

COMPARATIVE EXAMPLE 2

A sample was prepared in the same manner as in Example 6 except that the coating solution for low refractive index layer was changed to Coating Solution F for low refractive index layer.

(Evaluation of Antireflection Film)

The films obtained were evaluated on the following items.

(1) Average Reflectance

A spectral reflectance at an incident angle of 5° in the wavelength region of 380 to 780 nm was measured using an spectrophotometer (manufactured by Nippon Bunko K.K.). An average reflectance in the range from 450 to 650 nm was used as the result.

(2) Haze

The haze of each film obtained was measured using a haze meter MODEL 1001DP (manufactured by Nippon Denshoku Kogyo K.K.).

(3) Pencil Hardness Evaluation

As an index for scratch resistance, a pencil hardness evaluation described in JIS K 5400-1959 was performed. The antireflection film was subjected to humidity conditioning at a temperature of 25° C. and a humidity of 60% RH for 2 hours, tested under a load of 1 kg using a 3H test pencil prescribed in JIS S 6006-1996, and then evaluated according to the following 3-stage criteria:

○: Scratch was not observed at all in the evaluation of n=5.

Δ: One or two scratches were observed in the evaluation of n=5.

x: Three or more scratches were observed in the evaluation of n=5.

(4) Evaluation of Contact Angle and Finger-Print Attachment

As an index for antifouling property on the surface, an optical material subjected to humidity conditioning at a temperature of 25° C. and a humidity of 60% RH for 2 hours was measured on the contact angle to water. Furthermore, a finger print was attached to the surface of this sample and by observing the state after wiping it off with a cleaning cloth, the finger-print attachment was evaluated according to the following 3-stage criteria:

○: The finger print was completely wiped off.

Δ: The finger print was slightly observed.

x: The finger print was scarcely wiped off.

(5) Measurement of Kinetic Coefficient of Friction

As an index for surface slippage, the kinetic coefficient of friction was evaluated. The kinetic coefficient of friction used was a value obtained by measuring a sample after humidity conditioning at 25° C. and a relative humidity of 60% for 2 hours, with a 5 mm+stainless steel ball under a load of 100 g and at a rate of 60 cm/min using a kinetic friction measuring machine HEIDON-14.

(6) Evaluation of Antiglare Property

On each antiglare film prepared, an uncovered fluorescent lamp (8,000 cd/m$^2$) without a louver was reflected and the degree of shading of the reflected image was evaluated according to the following 4-stage criteria:

⊚: The contour of fluorescent lamp was not recognized at all.

○: The contour of fluorescent lamp was slightly recognized.

Δ: The fluorescent lamp was not clear but the contour could be recognized.

x: The fluorescent lamp was almost clearly recognized (no antiglare property).

(7) Evaluation of Glare

On each antiglare film prepared, diffused light of a fluorescent lamp with a louver was reflected and the glare on the surface was evaluated according to the following 3-stage criteria:

○: Glare was scarcely recognized.

Δ: Glare was slightly recognized.

x: Glare was recognized with an eye.

The results of Examples and Comparative Examples are shown in Table 1. In any of Examples 1 to 7, excellent antireflection effect was revealed and all capabilities required for antiglare and antireflection film, such as pencil hardness, finger-print attachment, antiglare property and glare, showed good results.

On the other hand, in Comparative Examples 1 and 2, since the solvent of the coating solution for low refractive index layer contained completely no component having a boiling point of 100° C. or less, the drying rate was very low, the planar state at coating was worsened and the thickness of coating was uneven, as a result, the reflectance, haze and antiglare property were bad.

EXAMPLE 8

Using each film of Examples 1 to 7, antiglare and antireflection polarizers were manufactured. Then, using each polarizer manufactured, liquid crystal display devices were fabricated, where the antireflection layer was disposed for the outermost layer. As a result, good contrast could be obtained due to no reflection of exterior light and by virtue of antiglare property, any sample could have excellent visibility without showing a reflected image.

(Preparation of Transparent Support)

(1) Preparation of Three-Layer Co-Cast Triacetyl Cellulose Film A (Preparation of Triacetyl Cellulose Dope A1)

Raw materials consisting of 17.4 parts by mass of triacetyl cellulose, 2.6 parts by mass of triphenyl phosphate, 66 parts by mass of dichloromethane, 5.8 parts by mass of methanol and 8.2 parts by mass of n-butanol were mixed and dissolved while stirring to prepare Triacetyl Cellulose Dope A1.

(Preparation of Triacetyl Cellulose Dope A2)

Raw materials consisting of 24 parts by mass of triacetyl cellulose, 4 parts by mass of triphenyl phosphate, 66 parts by mass of dichloromethane and 6 parts by mass of methanol were mixed and dissolved while stirring to prepare Triacetyl Cellulose Dope A2.

(Preparation of Three-Layer Co-Cast Triacetyl Cellulose Film A)

According to JP-A-11-254594 and the like, a three-layer co-casting die was disposed such that Dope A1 was co-cast in both sides of Dope A2, and the dopes were simultaneously ejected on a metal drum to cast multiple layers. The cast film was peeled off from the drum and dried to obtain a three-layer co-cast triacetyl cellulose film consisting of layers of 10 μm, 60 μm and 10 μm from the drum surface side. In this film, a clear interface was not formed between respective layers.

(2) Preparation of Triacetyl Cellulose Film B by Low-Temperature Dissolution Method (Preparation of Triacetyl Cellulose Dope B)

A non-uniform gel solution obtained by adding with stirring 20 parts by mass of triacetyl cellulose, 48 parts by mass of methyl acetate, 20 parts by mass of cyclohexanone, 5 parts by mass of methanol, 5 parts by mass of ethanol, 2 parts by mass of triphenyl phosphate/biphenyl diphenyl phosphate (½), 0.1 part by mass of silica (particle size: 20 nm) and 0.2 parts by mass of 2,4-bis-(n-octylthio)-6-(4-hydroxy-3,5-di-tert-butylanilino)-1,3,5-triazine, was cooled at −70° C. for 6 hours and then heated with stirring at 50° C. to prepare Dope B.

TABLE 1

|  | Reflectance (%) | Haze (%) | Pencil Hardness | Contact Angle (°) | Finger-Print Attachment | Kinetic Coefficient of Friction | Antiglare Property | Glare |
|---|---|---|---|---|---|---|---|---|
| Example |  |  |  |  |  |  |  |  |
| 1 | 1.2 | 9.2 | ○ | 102 | ○ | 0.08 | ⊚ | ○ |
| 2 | 1.2 | 9.2 | ○ | 102 | ○ | 0.08 | ⊚ | ○ |
| 3 | 1.3 | 9.1 | ○ | 102 | ○ | 0.08 | ⊚ | ○ |
| 4 | 1.3 | 9.1 | ○ | 102 | ○ | 0.08 | ⊚ | ○ |
| 5 | 1.2 | 9.0 | ○ | 102 | ○ | 0.08 | ⊚ | ○ |
| 6 | 1.2 | 9.2 | ○ | 102 | ○ | 0.08 | ⊚ | ○ |
| 7 | 1.2 | 9.1 | ○ | 102 | ○ | 0.08 | ⊚ | ○ |
| Comparative Example |  |  |  |  |  |  |  |  |
| 1 | 1.9 | 7.0 | ○ | 100 | ○ | 0.08 | Δ | ○ |
| 2 | 1.9 | 7.0 | ○ | 100 | ○ | 0.08 | Δ | ○ |

(Preparation of Triacetyl Cellulose Film B by Low-Temperature Dissolution Method)

According to JP-A-7-11055, Triacetyl Cellulose Dope B prepared above was single-layer cast on a drum to prepare Triacetyl Cellulose Film B having a thickness of 80 μm.

(3) Preparation of Triacetyl Cellulose Film C by High-Temperature Dissolution Method (Preparation of Triacetyl Cellulose Dope C)

A non-uniform gel solution obtained in the same manner as Triacetyl Cellulose Dope B was heated at 180° C. under 1 MPa for 5 minutes in a stainless steel-made closed vessel and then cooled by placing the gel solution with the vessel in a water bath at 50° C. to prepare Triacetyl Cellulose Dope C.

(Preparation of Triacetyl Cellulose Film C by High-Temperature Dissolution Method)

According to JP-A-7-11055, Triacetyl Cellulose Dope C prepared above was single-layer cast on a drum to prepare Triacetyl Cellulose Film C having a thickness of 80 μm.

EXAMPLE 9

[Preparation of Antiglare and Antireflection Film]

Coating Solution A for antiglare hard coat layer prepared above was coated on the three-layer co-cast Triacetyl Cellulose Film A obtained above using a bar coater and dried at 120° C. Thereafter, ultraviolet was irradiated thereon at an illuminance of 400 mW/cm² and a dose of 300 mJ/cm² using an air cooled metal halide lamp of 160 W/cm (manufactured by I-Graphics K.K.) to cure the coating layer and thereby form an antiglare hard coat layer having a thickness of 2.5 μm.

On this antiglare hard coat layer, Coating Solution A for low refractive index layer was coated using a bar coater and dried at 80° C. and then crosslinked under heat at 120° C. for 10 minutes to form a low refractive index layer having a thickness of 0.096 μm.

EXAMPLE 10

A sample was prepared in the same manner as in Example 9 except that the coating solution for low refractive index layer was changed to Coating Solution B for low refractive index layer.

EXAMPLE 11

A sample was prepared in the same manner as in Example 9 except that the coating solution for low refractive index layer was changed to Coating Solution C for low refractive index layer.

EXAMPLE 12

A sample was prepared in the same manner as in Example 9 except that the coating solution for low refractive index layer was changed to Coating Solution D for low refractive index layer.

EXAMPLE 13

A sample was prepared in the same manner as in Example 9 except that the coating solution for low refractive index layer was changed to Coating Solution E for low refractive index layer.

COMPARATIVE EXAMPLE 3

A sample was prepared in the same manner as in Example 9 except that the coating solution for low refractive index layer was changed to Coating Solution F for low refractive index layer.

EXAMPLE 14

The coating solution for hard coat layer obtained above was coated on the three-layer co-cast Triacetyl Cellulose Film A prepared above using a bar coater and dried at 120° C. Thereafter, ultraviolet was irradiated thereon at an illuminance of 400 mW/cm² and a dose of 300 mJ/cm² using an air cooled metal halide lamp of 160 W/cm (manufactured by I-Graphics K.K.) to cure the coating layer and thereby form a hard coat layer having a thickness of 2.5 μm.

On the thus-formed hard coat layer, Coating Solution A for antiglare hard coat layer was coated using a bar coater and then, under the same conditions as in the formation of the hard coat layer above, dried and UV-cured to form an antiglare hard coat layer having a thickness of about 1.5 μm. Further thereon, Coating Solution A for low refractive index layer prepared above was coated using a bar coater, dried at 80° C. and then crosslinked under heat at 120° C. for 10 minutes to form a low refractive index layer having a thickness of 0.096 μm.

EXAMPLE 15

A sample was prepared in the same manner as in Example 14 except that the coating solution for low refractive index layer was changed to Coating Solution B for low refractive index layer.

EXAMPLE 16

A sample was prepared in the same manner as in Example 14 except that the transparent support was changed to Triacetyl Cellulose Film B obtained by the low-temperature dissolution method.

EXAMPLE 17

A sample was prepared in the same manner as in Example 14 except that the transparent support was changed to Triacetyl Cellulose Film C obtained by the high-temperature dissolution method.

EXAMPLE 18

A sample was prepared in the same manner as in Example 15 except for using Coating Solution B for antiglare hard coat layer.

COMPARATIVE EXAMPLE 4

A sample was prepared in the same manner as in Example 14 except that the coating solution for low refractive index layer was changed to Coating Solution F for low refractive index layer.

(Evaluation of Antireflection Film)

The films obtained were evaluated in the same manner as above.

The results of Examples 9 to 18 and Comparative Examples 3 and 4 are shown in Table 2. In any of Examples 9 to 18, excellent antireflection effect was revealed and all capabilities required for the antiglare and antireflection film, such as pencil hardness, finger-print attachment, antiglare property and glare, showed good results.

In Examples 9 to 15, the smoothness of film was particularly excellent and therefore, the frequency of generating planar failures ascribable to the unevenness in the support thickness in the cross direction was greatly reduced.

Furthermore, in Example 18, the antiglare layer contained substantially no coarse particle and therefore, the frequency of generating grain-like planar failures was zero.

On the other hand, in Comparative Examples 3 and 4, since the solvent of the coating solution for low refractive index layer contained completely no component having a boiling point of 100° C. or less and therefore, the drying proceeded at a very low speed, as a result, the thickness of coating became uneven and the reflectance changed for the worse.

◉: Almost all pseudo dusts fell.
○: 80% or more of pseudo dusts fell.
Δ: 50% or more of pseudo dusts fell.
x: 50% or more of pseudo dusts remained on the film surface.

The results of each antiglare and antireflective film manufactured in Example 18 and Comparative Example 5 are shown in Table 3.

TABLE 2

| | Reflectance (%) | Haze (%) | Pencil Hardness | Contact Angle (°) | Finger-Print Attachment | Kinetic Coefficient of Friction | Antiglare Property | Glare |
|---|---|---|---|---|---|---|---|---|
| Example | | | | | | | | |
| 9 | 1.2 | 9.2 | ○ | 102 | ○ | 0.08 | ◉ | ○ |
| 10 | 1.2 | 9.2 | ○ | 102 | ○ | 0.08 | ◉ | ○ |
| 11 | 1.3 | 9.1 | ○ | 102 | ○ | 0.08 | ◉ | ○ |
| 12 | 1.3 | 9.1 | ○ | 102 | ○ | 0.08 | ◉ | ○ |
| 13 | 1.2 | 9.0 | ○ | 102 | ○ | 0.08 | ◉ | ○ |
| 14 | 1.2 | 9.2 | ○ | 102 | ○ | 0.08 | ◉ | ○ |
| 15 | 1.2 | 9.1 | ○ | 102 | ○ | 0.08 | ◉ | ○ |
| 16 | 1.2 | 9.1 | ○ | 102 | ○ | 0.08 | ◉ | ○ |
| 17 | 1.2 | 9.1 | ○ | 102 | ○ | 0.08 | ◉ | ○ |
| 18 | 1.2 | 9.1 | ○ | 102 | ○ | 0.08 | ◉ | ○ |
| Comparative Example | | | | | | | | |
| 3 | 1.9 | 9.3 | ○ | 100 | ○ | 0.08 | ◉ | ○ |
| 4 | 1.9 | 9.4 | ○ | 100 | ○ | 0.08 | ◉ | ○ |

EXAMPLE 19

Using each film of Examples 9 to 18, antiglare and antireflection polarizers were manufactured. Then, using each polarizer manufactured, liquid crystal display devices were fabricated, where the antireflection layer was disposed for the outermost layer. As a result, good contrast could be obtained due to no reflection of exterior light and by virtue of antiglare property, any sample could have excellent visibility without showing a reflected image COMPARATIVE EXAMPLE 5

A sample was prepared in the same manner as in Example 18 except for using Coating Solution G for low refractive index layer.

(Evaluation of Antiglare Film and Antiglare Antireflection Film)

The films obtained in Example 18 and Comparative Example 5 were evaluated on the following items.

(1) Surface Resistivity

Samples of Example 18 and Comparative Example 5 were verified to have a surface resistivity of $1 \times 10^{12}$ Ω/□ or more by the measurement using a circular electrode method.

(2) Vertical Release Charge

The films obtained were measured on the vertical release charge with TAC. The measurement method is described in the text.

(2) Prevention of Dusts from sticking (Dust-Protecting Property)

A film to be measured was adhered to a glass plate and after removing electricity, reciprocatingly rubbed 10 times with TRACY produced by Toray. Fine polystyrene foam powder recognized as pseudo dusts was dispersed on the entire film and after raising the film, falling of pseudo dusts was observed and evaluated by the following 4-stage criteria.

TABLE 3

| | Vertical Release Charge (pc) | Prevention of Dusts from Sticking |
|---|---|---|
| Example 18 | +50 | ◉ |
| Comparative Example 5 | −300 | x |

From the results shown in Table 3, the followings are known.

The film of Example 18 satisfying the vertical release charge specified in the present invention, exhibited good dust-protecting property (prevention of dusts from sticking) and fulfilled all requirements on the reflectance, antiglare property and clearness of transmitted image.

On the other hand, the film of Comparative Example 5 failing in satisfying the vertical release charge specified in the present invention and having a large absolute value of vertical release charge was seriously poor in the dust-protecting property.

While the invention has been described in detail and with reference to specific embodiments thereof, it will be apparent to one skilled in the art that various changes and modifications can be made therein without departing from the spirit and scope thereof.

What is claimed is:

1. An antiglare and antireflection film having asperities on the surface, wherein the vertical release charge amount with triacetyl cellulose or polyethylene terephthalate at an ordinary temperature and an ordinary humidity is −200 to +200 pc/cm² at the surface resistivity is $1 \times 10^{11}$ Ω/□ or more.

2. An antiglare and antireflection film as claimed in claim 1, which has a transparent support having thereon an antiglare hard coat layer and a low refractive index layer having a refractive index of 1.38 to 1.49.

3. The antiglare and antireflection film as claimed in claim 1, wherein the vertical release charge amount is from −100 to +100 pc/cm².

4. The antiglare and antireflection film as claimed in claim 3, which is an antiglare and antireflection film in a post-saponification system of performing the saponification after coating the antireflection layer.

5. The antiglare and antireflection film as claimed in claim 1, wherein the vertical release charge amount with triacetyl cellulose or polyethylene terephthalate under conditions of ordinary temperature and 10% RH is −100 to +100 pc/cm$^2$ and the surface resistivity is $1\times10^{11}$ Ω/□ or more.

6. The antiglare and antireflection film as claimed in claim 1, wherein the low refractive index layer comprises a fluorine-containing compound crosslinked by heat or ionizing radiation and has a kinetic coefficient of friction of 0.03 to 0.15 and a contact angle to water of 90 to 120°.

7. The antiglare and antireflection film as claimed in claim 1, wherein the low refractive index layer contains inorganic fine particles having an average particle size of 0.001 to 0.2 μm.

8. The antiglare and antireflection film as claimed in claim 1, wherein the antiglare hard coat layer contains mat particles having an average particle size of 1.0 to 10.0 μm and the portion other than the mat particles of said antiglare hard coat layer has a refractive index of 1.57 to 2.00.

9. The antiglare and antireflection film as claimed in claim 8, wherein said mat particles contains a particle satisfying the following conditions (i) to (iii) with respect to the particle size distribution:

Conditions with Respect to Particle Size Distribution (i) the number average particle size measured by the Coulter method is from 1.7 to 3.5 μm, (ii) the standard deviation of the particle size is 25% or less of said number average particle size, and (iii) coarse particles having a particle size 3.0 μm or more larger than said number average particle size or coarse particles 2.5 times or more larger than said number average particle size are contained in a proportion of less than 5 particles/$1\times10^8$ particles.

10. The antiglare and antireflection film as claimed in claim 1, wherein the transparent support is a triacetyl cellulose film obtained by dissolving triacetyl cellulose in a solvent and casting the prepared triacetyl cellulose dope using a single layer casting method or a multiple layer co-casting method.

11. The antiglare and antireflection film as claimed in claim 10, wherein said triacetyl cellulose dope is a triacetyl cellulose dope prepared by dissolving triacetyl cellulose in a solvent containing substantially no dichloromethane, using a low-temperature or high-temperature dissolving method.

12. The antiglare and antireflection film as claimed in claim 1, wherein a haze is 3.0 to 20.0% and the average reflectance of light with a wavelength of 450 to 650 nm is 1.8% or less.

13. A polarizer using an antiglare and antireflection film for at least one sheet of two protective films of the polarizing layer, said antiglare and antireflection film having asperities on the surface wherein the verticle release charge amount measured with triacetyl cellulose or polyethylene terephalate at an ordinary temperature and an ordinary humidity is 200 to +200 pc/cm$^2$ at the surface resistivity is $1\times10^{11}$ Ω/□ or more.

14. A liquid crystal display device using, for the outermost layer of the display, an antiglare and antireflection film asperities on the surface wherein the verticle release charge amount measured with triacetyl cellulose or polyethylene terephalate at an ordinary temperature and an ordinary humidity is −200 to +200 pc/cm$^2$ at the surface resistivity is $1\times10^{11}$ Ω/□ or more.

* * * * *